United States Patent [19]

Shoji et al.

[11] Patent Number: 5,157,483
[45] Date of Patent: Oct. 20, 1992

[54] MULTICOLOR IMAGE FORMING METHOD AND APPARATUS

[75] Inventors: Hisashi Shoji; Seiichiro Hiratsuka, both of Hachioji, Japan

[73] Assignee: Konica Corporation, Tokyo, Japan

[21] Appl. No.: 722,404

[22] Filed: Jun. 20, 1991

Related U.S. Application Data

[63] Continuation of Ser. No. 209,591, Jun. 21, 1988, abandoned.

[30] Foreign Application Priority Data

Jun. 22, 1987 [JP] Japan ................. 62-156217
Jun. 22, 1987 [JP] Japan ................. 62-156218

[51] Int. Cl.$^5$ ............................... H04N 1/40
[52] U.S. Cl. .......................... 358/75; 358/80
[58] Field of Search ............. 358/75, 80, 448, 447, 358/461, 466, 465, 444

[56] References Cited

U.S. PATENT DOCUMENTS

| | | | |
|---|---|---|---|
| 208,919 | 1/1887 | Uchiyama | 358/75 |
| 4,462,043 | 7/1984 | Saitou | 358/75 |
| 4,668,980 | 5/1987 | Stansfield et al. | 358/80 |
| 4,821,115 | 4/1989 | Matsushima | 358/75 |
| 4,953,013 | 8/1990 | Tsuji et al. | 358/447 |

FOREIGN PATENT DOCUMENTS

| | | |
|---|---|---|
| 2300514 | 1/1973 | Fed. Rep. of Germany . |
| 3408109 | 3/1984 | Fed. Rep. of Germany . |
| 3525414 | 7/1985 | Fed. Rep. of Germany . |
| 3526878 | 7/1985 | Fed. Rep. of Germany . |
| 50-30537 | 3/1975 | Japan . |
| 52-106743 | 9/1977 | Japan . |
| 55-18656 | 2/1980 | Japan . |
| 55-18657 | 2/1980 | Japan . |
| 55-18658 | 2/1980 | Japan . |
| 55-18659 | 2/1980 | Japan . |
| 56-144452 | 11/1981 | Japan . |
| 56-161566 | 12/1981 | Japan . |
| 57-64718 | 4/1982 | Japan . |
| 58-79261 | 5/1983 | Japan . |
| 58-96900 | 6/1983 | Japan . |
| 58-11554 | 7/1983 | Japan . |
| 58-116553 | 7/1983 | Japan . |

(List continued on next page.)

OTHER PUBLICATIONS

William Beyer, CPC Standard Mathematic Tables, 26th Ed. (1982), p. 176.
German Official Action, Apr. 30, 1990, with attached English translation.
British Official Action, Dec. 7, 1990.
British Official Action, Aug. 22, 1991.

Primary Examiner—Edward L. Coles, Sr.
Assistant Examiner—Jerome Grant, II
Attorney, Agent, or Firm—Finnegan, Henderson, Farabow, Garrett and Dunner

[57] ABSTRACT

A multicolor image forming method includes a first step of optically scanning and color separating an original so as to obtain first image signals corresponding to R, G and B multicolor components, a second step of parallelly inputting the first image signals as address signals to a reference memory storing at least one reference table representative of at least two different types of color correction for converting the first image signals into second image signals corresponding to at least Y, M and C multicolor components, a third step of selecting second image signals corresponding to one color component from the second image signals corresponding to the multicolor components output from the reference memory, a fourth step of providing a latent image made by image exposure onto a moveable image carrier having a photoconductive property based on the second image signals corresponding to the color component selected in the third step, a fifth step of developing the latent image formed on the image carrier in the fourth step using a chromatic toner, a sixth step of repeating the third, fourth, and fifth steps while changing color components of the second image signals selected in the third step and the color toners used in the fifth step, and a seventh step of transferring a multicolor toner image formed on the image carrier to the transfer material.

14 Claims, 13 Drawing Sheets

FOREIGN PATENT DOCUMENTS

| | | |
|---|---|---|
| 58-57446 | 10/1984 | Japan . |
| 59-181362 | 10/1984 | Japan . |
| 59-22847 | 12/1984 | Japan . |
| 58-96901 | 12/1984 | Japan . |
| 58-96902 | 12/1984 | Japan . |
| 58-96903 | 12/1984 | Japan . |
| 58-97973 | 12/1984 | Japan . |
| 59-222851 | 12/1984 | Japan . |
| 59-222852 | 12/1984 | Japan . |
| 59-222853 | 12/1984 | Japan . |
| 59-223467 | 12/1984 | Japan . |
| 60-76766 | 5/1985 | Japan . |
| 60-95456 | 5/1985 | Japan . |
| 60-150066 | 8/1985 | Japan . |
| 60150066 | 8/1985 | Japan . |
| 60-176069 | 9/1985 | Japan . |
| 61-170754 | 8/1986 | Japan . |
| 62-52566 | 3/1987 | Japan . |
| 62-52567 | 3/1987 | Japan . |
| 60-192710 | 3/1987 | Japan . |
| 60-192711 | 3/1987 | Japan . |
| 61-14537 | 7/1987 | Japan . |
| 61-014539 | 7/1987 | Japan . |
| 62-172375 | 7/1987 | Japan . |
| 62-172376 | 7/1987 | Japan . |
| 0319802 | 6/1989 | Japan . |
| 2070381A | 9/1981 | United Kingdom . |
| 2070381 A | 9/1981 | United Kingdom . |
| 2073987A | 10/1981 | United Kingdom . |
| 2133657A | 7/1984 | United Kingdom . |
| 2129449A | 11/1984 | United Kingdom . |
| 2139449A | 11/1984 | United Kingdom . |

PRIOR ART
FIG. 2(a) INITIALIZATION (DISCHARGING)
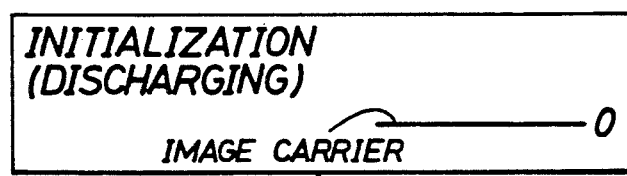
FIG. 2(b) CHARGING
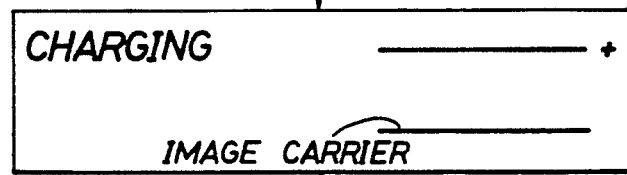
FIG. 2(c) FIRST IMAGE EXPOSURE
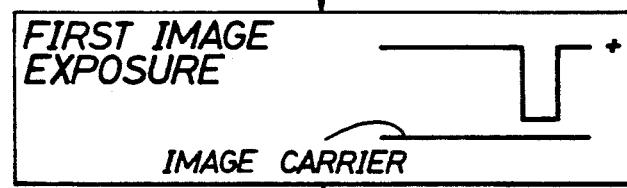
FIG. 2(d) FIRST DEVELOPMENT
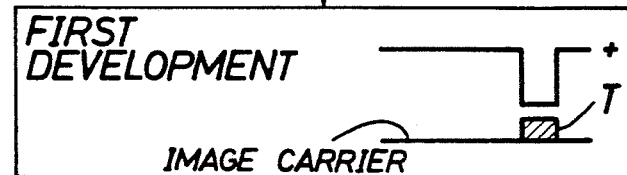
FIG. 2(e) SECOND IMAGE EXPOSURE
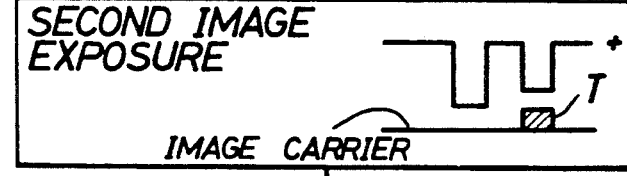
FIG. 2(f) SECOND DEVELOPMENT
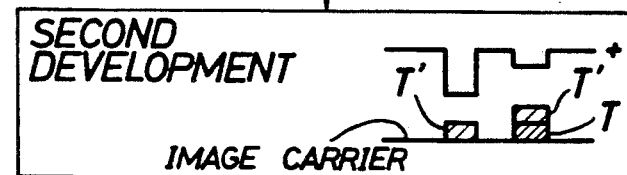

| $X_1\ Y_1\ Z_1$ | $X_2\ Y_2\ Z_2$ | $X_3\ Y_3\ Z_3$ | $X_4\ Y_4\ Z_4$ |
|---|---|---|---|
| $X_5\ Y_5\ Z_5$ | $X_6\ Y_6\ Z_6$ | $X_7\ Y_7\ Z_7$ | $X_8\ Y_8\ Z_8$ |
| $X_9\ Y_9\ Z_9$ | $X_{10}\ Y_{10}\ Z_{10}$ | $X_{11}\ Y_{11}\ Z_{11}$ | $X_{12}\ Y_{12}\ Z_{12}$ |
| $X_{13}\ Y_{13}\ Z_{13}$ | $X_{14}\ Y_{14}\ Z_{14}$ | $X_{15}\ Y_{15}\ Z_{15}$ | $X_{16}\ Y_{16}\ Z_{16}$ |

MULTICOLOR IMAGE FORMING METHOD AND APPARATUS

This application is a continuation of application Ser. No. 209,591, filed Jun. 21, 1988, now abandoned.

BACKGROUND OF THE INVENTION

1. Field of the Invention

The present invention relates to a multicolor image forming apparatus and, more particularly, to a multicolor image forming apparatus suitable for image formation by electrophotography.

2. Description of the Prior Art

In recent years, multicolor image forming apparatuses which obtain a full-color copy using a full-color original image (original) are available. A multicolor image allows reproduction from an original such as a portrait, still life, landscape, or the like and also allows to record a large number of data in a single recording image. For this reason, a multicolor image is very suitable for graphs, tables, and the like.

Under these circumstances, a variety of multicolor image forming methods and apparatuses have been developed.

For example, a plurality of latent image forming means and a plurality of developing means are disposed around a rotary photosensitive drum (image carrier). Latent image formation and development are repeated to overlay visible images (toner images) of different colors on the photosensitive drum. Thereafter, the toner images are simultaneously transferred to a transfer material. This method is disclosed in Japanese Patent Laid-Open (Kokai) Nos. 52-106743, 56-144452, 58-79261, and 61-170754.

In a method disclosed in Japanese Patent Laid-Open (Kokai) Nos. 60-76766, 60-95456, and 61-170754, one latent image forming means and a plurality of developing means are disposed around the rotary photosensitive drum, and latent image formation and development for one color are performed during single rotation of the photosensitive drum. Thus, the photosensitive body is rotated a plurality of times to form a multicolor visual image thereon. Thereafter, the multicolor image is simultaneously transferred to a transfer material.

In the former method, when colors to be reproduced are full colors, i.e., yellow, magenta, cyan, and black (if necessary), the latent image forming means and the developing means corresponding in number to the colors must be arranged around the photosensitive drum. Thus, the diameter of the photosensitive drum must be increased, resulting in a bulky apparatus. Control and an apparatus for maintaining very high write precision of the latent image forming means such as a laser, LED, LCS, and the like must be prepared in order to guarantee registration of color separated latent images during formation of latent images. Meanwhile, since a single read-scan operation need only be performed, registration upon reading is good. However, an image memory having a large capacity is necessary.

In the latter method, since only one latent image forming means is required, the apparatus can be made more compact than that in the former method. In addition, since the latent image forming means is commonly used, registration of latent images can be guaranteed. In the latter method, a multicolor image is formed on the basis of the principle shown in FIGS. 1 to 4. Note that FIGS. 1 to 4 show operations until a second development process is performed, and the following operation is the same and is omitted.

FIG. 1 shows a case wherein a latent image is formed by a latent image forming method in which a non-exposed portion serves as a coloring portion, and toner charged in an opposite polarity to the latent image is attached to the latent image, thereby developing the image. In this method, first uniform charging is performed as shown in FIG. 1(b) on the surface of an image carrier in an initial state at a potential of 0 V shown in FIG. 1(a). First image exposure shown in FIG. 1(c) is performed on the charged surface based on color image data of the first color, so that a latent image is formed to have a potential of substantially 0 V excluding the coloring portion. Then, first development shown in FIG. 1(d) is performed for the latent image using a toner T which is colored in a predetermined color and is charged in an opposite polarity to the latent image.

Second uniform charging shown in FIG. 1(e) is performed on the image carrier on which the toner image of the first color is formed. Second image exposure shown in FIG. 1(f) is performed on the charged surface based on color image data of the second color different from the first color, so that a latent image is formed to have a potential of substantially 0 V excluding the coloring portion. The obtained latent image is subjected to second development using a corresponding color toner T'. As a result, a two-color toner image is formed by the toners T and T' on the image carrier.

Similarly, third and fourth latent image formation and development operations are performed to form a multicolor toner image by overlaying color toner images.

In the case of FIG. 1, since the latent image is developed using toner charged in an opposite polarity to the latent image, a developing density of each color can be easily increased. Therefore, a clear multicolor image can be easily formed. Note that a potential may be left on a toner image formed earlier and color mixture tends to occur. Thus, in order to prevent color mixture, a DC developing bias is gradually increased for the following development processes, and a charging potential is correspondingly increased. When the obtained multicolor toner image is transferred to a transfer material, corona transfer can be performed by means for uniforming a charged polarity of toners.

FIGS. 2 to 4 show cases wherein a latent image is formed by a latent image forming method in which an image exposed portion serves as a coloring portion, and an inverting development method is employed, i.e., toner charged in the same polarity as a potential of a non-exposed portion is applied to the latent image, thereby performing development.

In the case of FIG. 2, uniform charging is performed on the surface of an image carrier in the same initial state as shown in FIG. 1. Then, first image exposure is performed on the charged surface by an exposure means such as a laser beam scanner based on color image data of the first color so that the coloring portion has a potential of substantially 0 V. The obtained latent image is then subjected to first development using a predetermined color toner (in this case, unlike in FIG. 1, toner charged in the same polarity as that of the image carrier). Thereafter, image exposure is performed by the same or different exposure means based on color image data of the second color. A portion of the obtained latent image at a potential of 0 V is developed by the corresponding color toner. Third and fourth latent image formation and development operations are performed to obtain a multicolor toner image. In this case, even if a toner T charged in the same polarity as that of the image carrier is applied to the latent image having a potential of substantially 0 V, the potential of the latent image does not become substantially equal to a background potential, as shown in FIG. 2. During development wherein a toner T' of a different color is applied to the latent image formed later, the toner T' tends to become attached to the latent image portion on which the toner T has already been attached although exposure, i.e., a write operation is not performed. Therefore, by utilizing a feature that color toners tend to be overlaid on each other without being mixed, a single-color image or a multicolor image with high sharpness can be obtained.

In the case of FIG. 2, a toner image is formed to positively overlay a position to which toner has already been attached. However, in the case of FIG. 3, in order to prevent color mixture caused by nonselective attachment of different color toners during the following development processes, re-charging is performed after the first development to smooth the surface potential. In FIG. 3, the operations from initialization to the first development are the same as those in FIG. 2. Thereafter, unlike in FIG. 2, the image carrier is uniformly charged, and second image exposure and second development are performed on the charged surface. Similarly, third and fourth latent image formation and development operations are performed. In this manner, in FIG. 3 wherein after the first development, the surface of the image carrier is uniformly re-charged to perform the following latent image formation and development, a position to which the toner image has already been formed can be exposed to again form a latent image thereon. In addition, unless an image position to which the toner has already been attached is exposed, the following different color toners will not be easily attached thereto.

In the case of FIG. 4, different color toners are especially prevented from being attached to an image position to which the toner has already been attached. In FIG. 4, the operations from initialization to the first development are the same as those in FIG. 3. After the first development, the surface of the image carrier is uniformly exposed using an exposure lamp, and second charging is then performed. Alternatively, the surface of the image carrier is uniformly charged, and then second image exposure and second development are performed. Similarly, third and fourth latent image formation and development operations are repeated. After development, if the surface of the image carrier is uniformly charged first, the potential of the image carrier including a portion which was developed by toner becomes substantially 0. When second charging is then performed, a difference between the potential of the portion applied with toner and that of other portions is decreased, and the surface of the image carrier can be uniformly charged. This also leads to a preferred result for a photosensitive body having an optical memory. When second charging is performed after development to uniformly charge the surface of the image carrier, and then uniform weak exposure is performed, the charged state of the surface of the image carrier to which the toner is attached has a higher potential than that in a case wherein no toner is attached. Therefore, when a latent image formed by next exposure is to be developed, since a portion to which the toner has already been attached has a potential equal to or higher than an unexposed portion unless it is exposed, attachment of toner to the portion can be effectively prevented.

In any process of FIGS. 1 to 4 described above, a toner image which has already been formed on the image carrier influences the second and subsequent image formation processes. This influence will be described in detail below:

(1) During Charging:
Portions with and without toner have different potentials.

(2) During Image Exposure:
When exposure is performed on attached toner, exposure light is partially absorbed or reflected and scattered, an essential exposure amount is attenuated, and a latent image potential is increased.

(3) During Development:
A charge of attached toner or the thickness of a toner image influences development characteristics.

These factors are correlated with each other and give a complicated influence on image forming characteristics. For this reason, a color image signal must be corrected in correspondence with the image forming characteristics. Optical characteristics required for a toner image vary depending on whether an image on a transfer material on which the toner image formed is transferred is observed by reflection light like paper or is observed by transmitted light like a transparent film and an OHP film and on the characteristics of a spectral reflectance or spectral transmittance or these materials.

A color image is generally read to be separated into three colors, i.e., red (R), green (G), and blue (B), and the read color signals are converted into four colors, i.e., yellow (Y), magenta (M), cyan (C), and black (BK) corresponding to toner colors, thus performing image formation. More specifically, image data read as positive values R, G, and B are generally converted into positive values Y, M, C, and BK corresponding to attachment area ratios of respective color toners.

For this purpose, masking processing regarding toner characteristics is considered to be effective. In this processing, conversion from R, G, and B into Y, M, C, and BK is performed by a linear or quadratic (or higher) matrix arithmetic operation.

In a color laser printer or the like utilizing the above-mentioned image forming method, a pulse width of a write laser beam is changed so as to change a density of toner transferred to a transfer sheet. Thus, an amount of toner attached to an image carrier is changed by several steps, or a toner attachment area is stabilized using an area gradation method such as a Dither method, a density pattern method, or the like, thereby representing gradation.

When the above-mentioned methods are combined, a multicolor hard copy can be relatively easily obtained without using, e.g., a Dither pattern.

However, when a plurality of color toners are overlaid on the image carrier, the color toner which was developed first and the toner overlaid thereon have considerably different developing characteristics, as described above. For this reason, it is difficult to approximate the relationship between a write laser beam and a transfer amount, i.e., the relation of conversion from R, G, and B into Y, M, C, and BK by a polynomial.

It is very difficult to change a color correction method in accordance with the types of transfer material (i.e., paper, OHP, or others, and their spectral characteristics) and a user's favor.

SUMMARY OF THE INVENTION

It is a first object of the present invention to provide a multicolor image forming method and apparatus which can easily change a color correction method.

It is a second object of the present invention to provide an image forming method and apparatus, which can achieve both improved color reproduction accuracy and high-speed processing with a simple circuit arrangement.

BRIEF DESCRIPTION OF THE ACCOMPANYING DRAWINGS

FIGS. 1 to 4 are views for explaining conventional different image forming methods;

Figure 5:
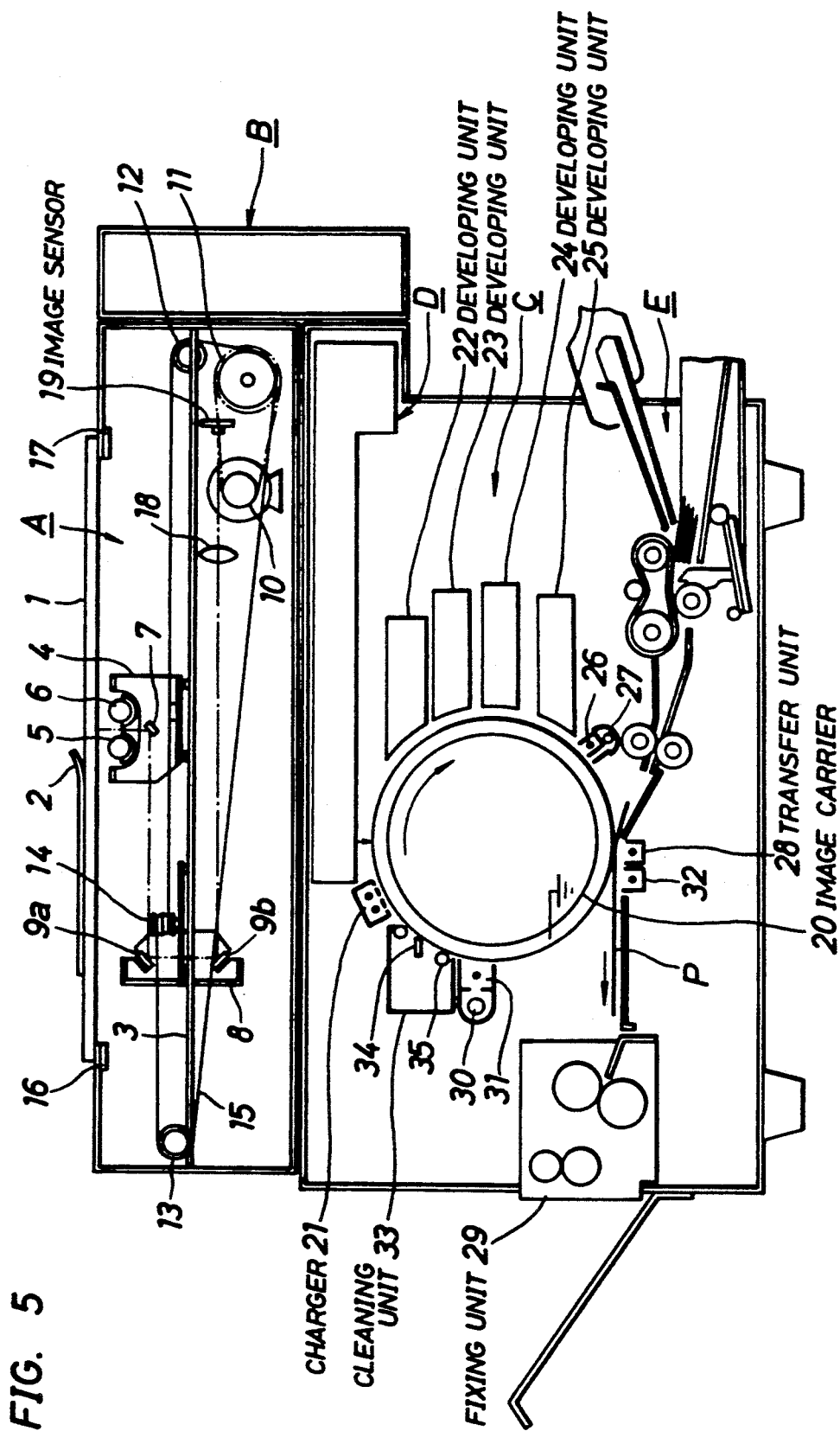
FIG. 5 is a schematic sectional view of a mechanical structure of a multicolor image forming apparatus according to the present invention.
Figure 11:
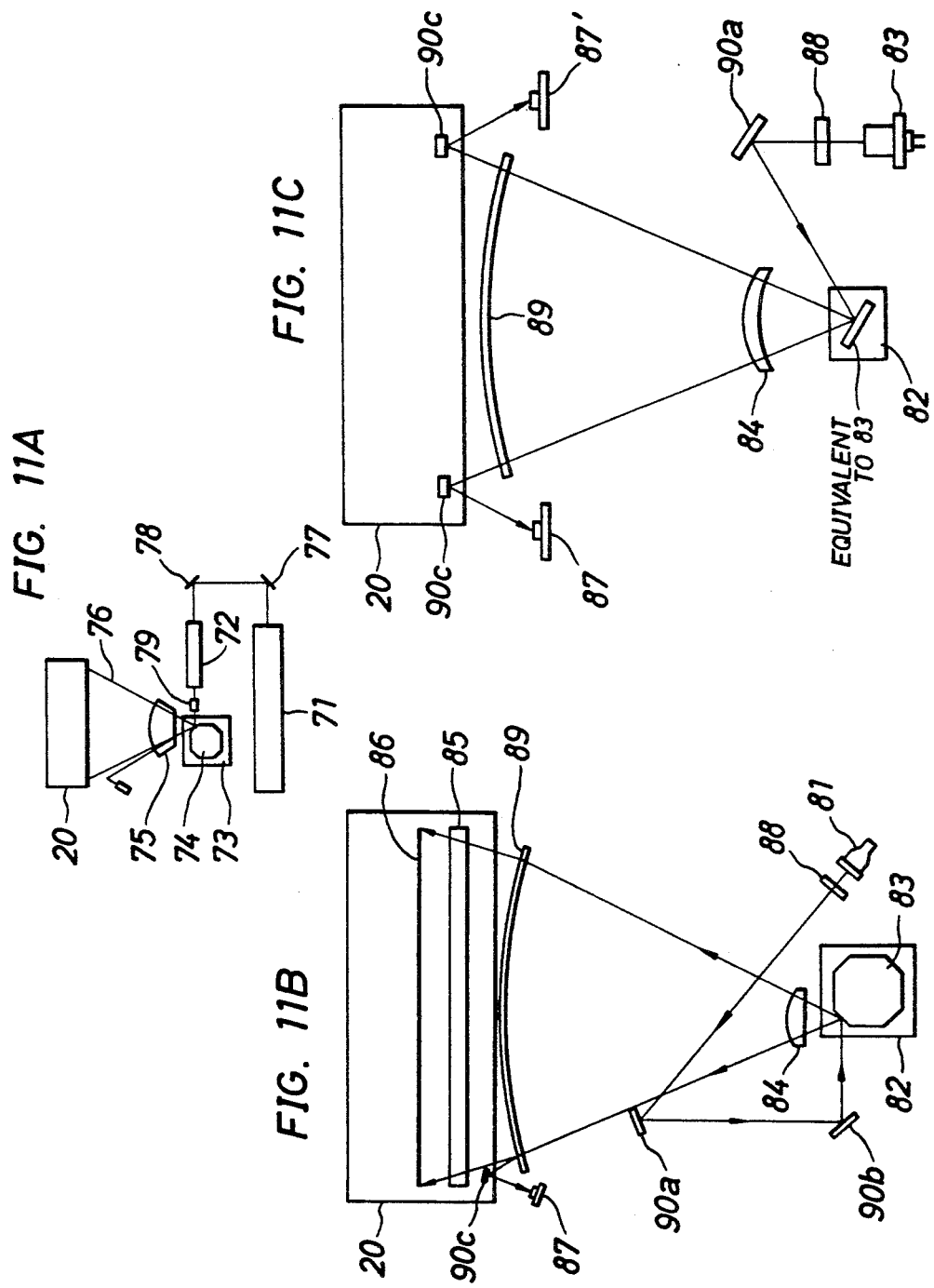
Figure 12:
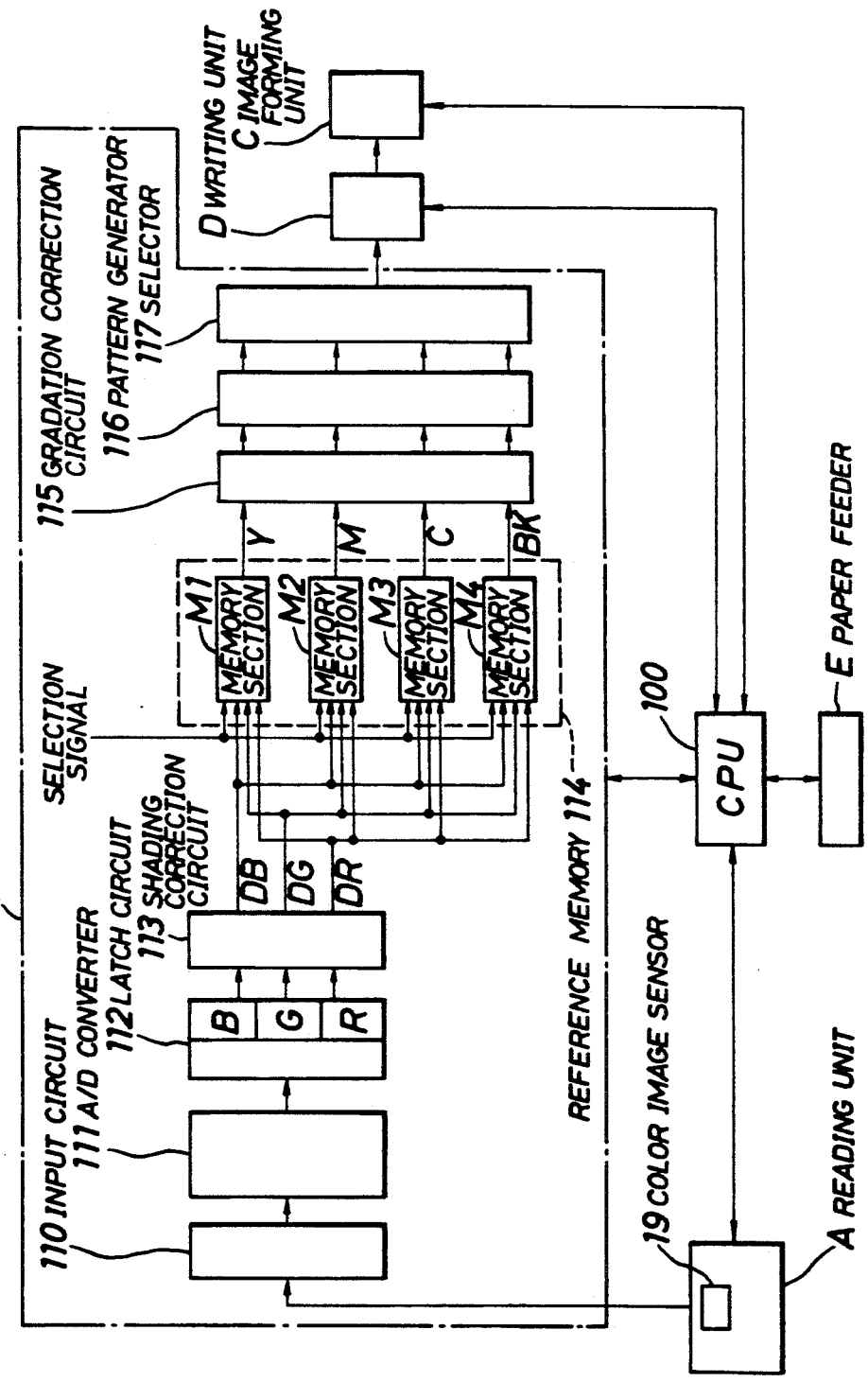
Figure 13:
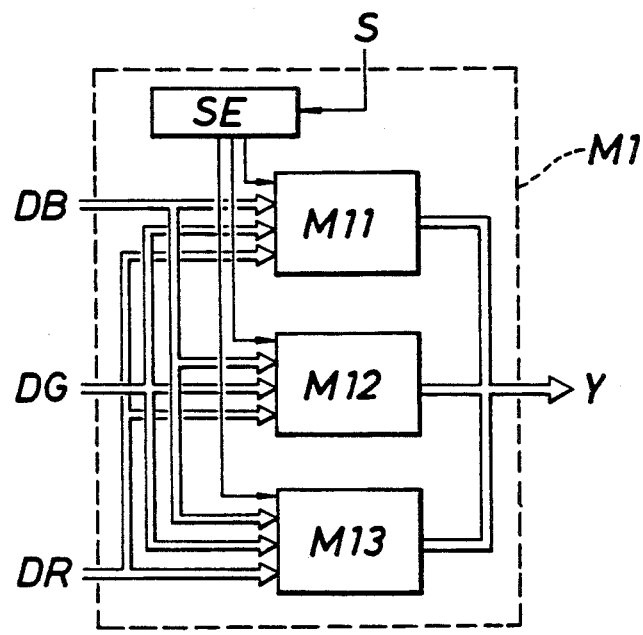
Figure 14:
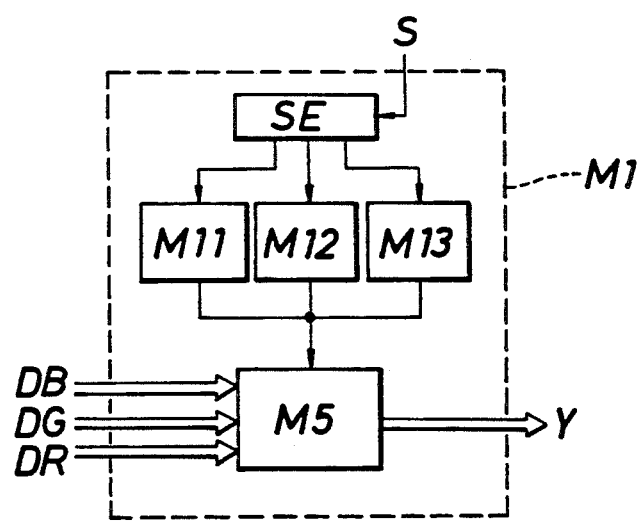
Figure 15:
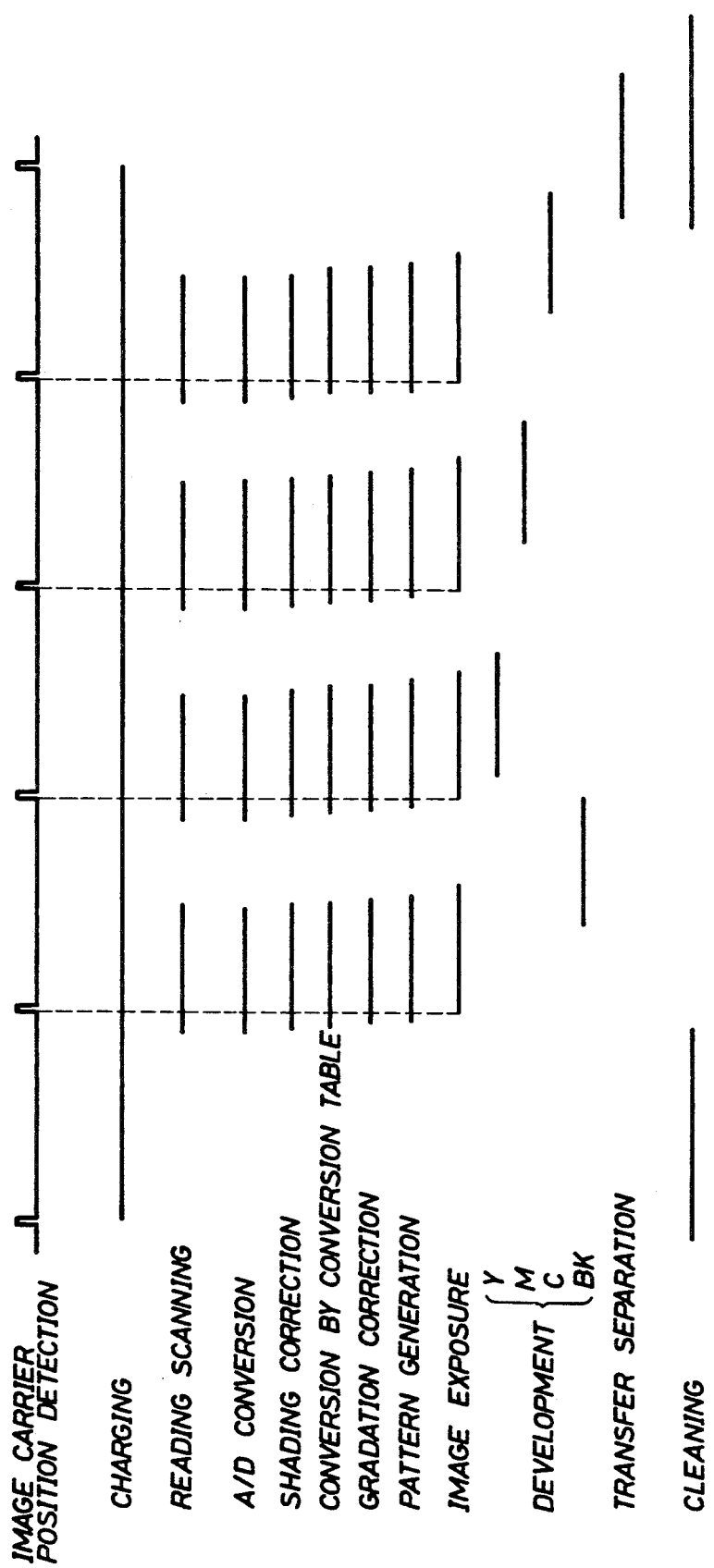
Figure 16:
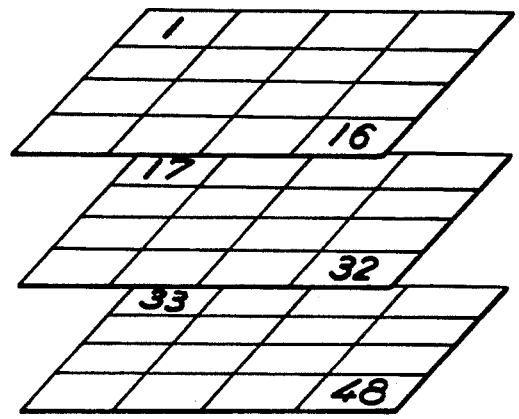
Figure 17:
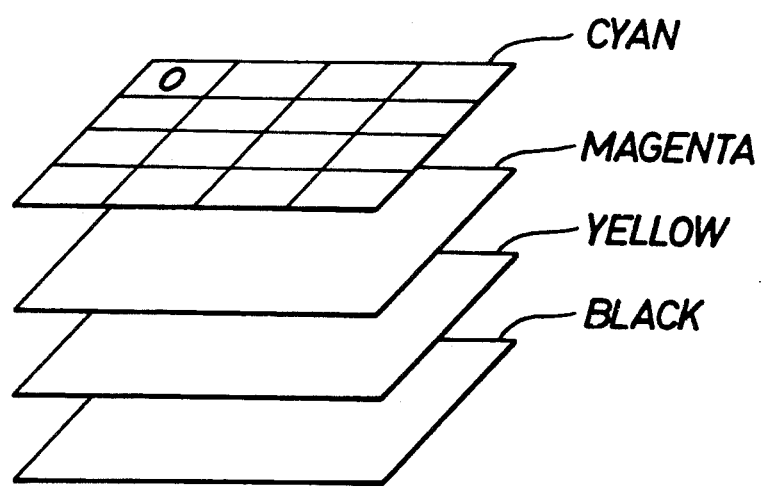
Figures 18, 19:
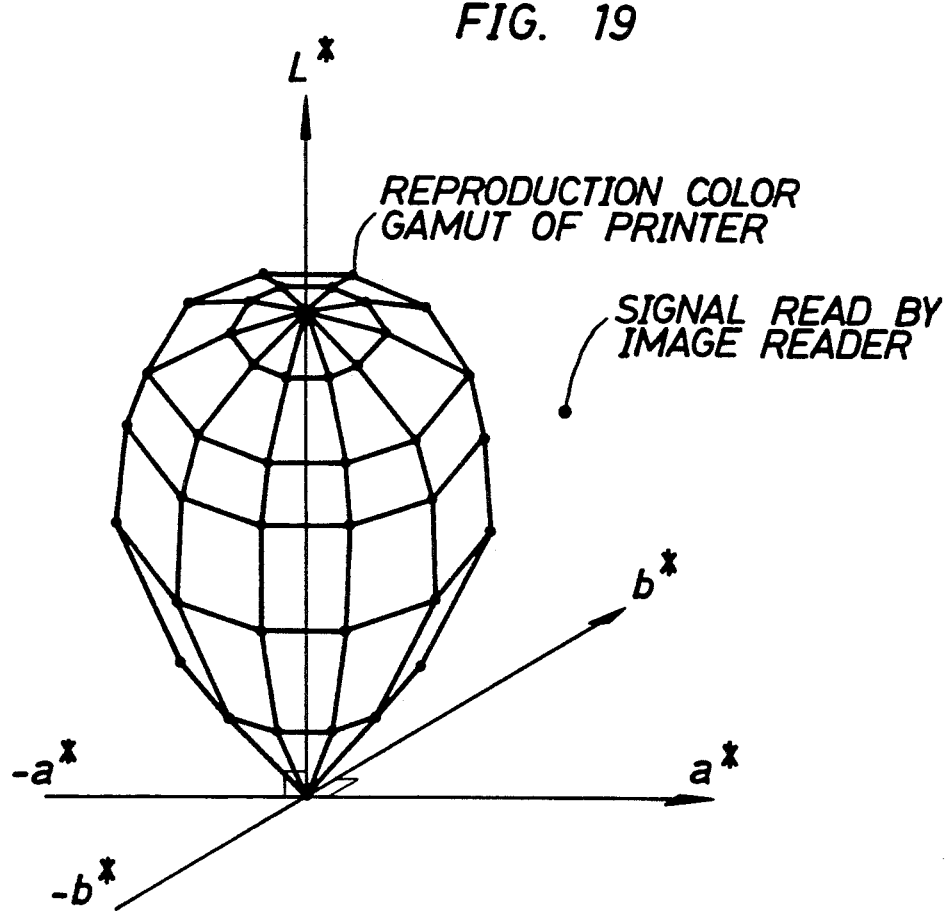

FIGS. 11A, 11B, and 11C are views showing different arrangements of a laser beam scanner used as a writing unit shown in FIG. 5;

FIG. 12 is a block diagram showing an electrical arrangement of a multicolor image forming apparatus as an example of an apparatus for practicing the method of the present invention and as an embodiment of the apparatus according to the present invention;

FIGS. 13 and 14 are block diagrams showing different arrangements of a memory section in a reference memory;

FIG. 15 is a timing chart showing an operation of the apparatus shown in FIG. 12;

FIG. 16 is a view for explaining a threshold value matrix;

FIG. 17 is a view for explaining a matrix;

FIG. 18 is a view for explaining a matrix; and

FIG. 19 is a view showing a color reproduction state.

DETAILED DESCRIPTION OF THE PREFERRED EMBODIMENTS

An image forming apparatus as an example of an apparatus for practicing the method of the present invention and as an embodiment of an apparatus according to the present invention will be described hereinafter with reference to the accompanying drawings.

FIG. 5 shows a mechanical structure of this apparatus, and an example of an optical system. In FIG. 5, reference symbol A denotes a reading unit; B, an image data processor; C, an image forming unit; D, a writing unit; and E, a paper feeder.

In the reading unit A, reference numeral 1 denotes a platen glass on which an original 2 is placed. Reference numeral 3 denotes a slide rail extending in the lateral direction (sub-scanning direction) in FIG. 5. A carriage 4 is movably arranged on the slide rail 3. Reference numerals 5 and 6 denote linear fluorescent lamps which are used as exposure light sources arranged perpendicular to the sheet surface of FIG. 5. The fluorescent lamps 5 and 6 are moved together with the carriage 4. The original 2 is illuminated by the fluorescent lamps 5 and 6. The fluorescent lamps 5 and 6 adopt commercially available warm-white fluorescent lamps so as to prevent emphasis or attenuation of a specific color by the characteristics of the light sources during reading of a color original. The lamps 5 and 6 are turned on by a high-frequency power supply at a frequency of 40 kHz in order to prevent flickering. Reference numeral 7 denotes a mirror for receiving light reflected by the original 2. The mirror 7 is arranged on the carriage 4. Reference numeral 8 denotes a movable mirror unit in which mirrors 9a and 9b are disposed at an angle of 90°, and which is movable along the slide rail 3. Reference numeral 10 denotes a stepping motor for driving the carriage 4 and the movable mirror unit 8; and 11 to 14, pulleys on which a wire 15 is looped. The carriage 4 is locked by the wire 15, and the support shaft of the pulley 14 is mounted on the movable mirror unit 8. In order to make the wire 15 taut, after one end of the wire 15 is locked at the left side wall of FIG. 5 of the apparatus, the wire 15 is wound around the upper groove of the pulley 14 and the pulley 13, and is then wound a plurality of times around the pulley 11 which is driven by the stepping motor 10 through a belt. Thereafter, the wire 15 is wound around the pulley 12 and the lower groove of the pulley 14, and is then locked at the right side wall in FIG. 5. Thus, when the stepping motor 10 is started, the pulleys 11 to 14 are rotated, and the carriage 4 and the movable mirror unit 8 are moved at speeds V and V/2, respectively, in the lateral direction in FIG. 5. Reference numerals 16 and 17 denote reference white plates disposed on the rear surfaces of two end portions of the platen glass 1. With these plates 16 and 17, reference white signals can be obtained before and after the original read scanning operation. Reference numeral 18 denotes a lens receiving the light reflected by the original surface through the mirrors 7, 9a, and 9b; and 19, a linear CCD color image sensor which receives light focused by the lens 18. In the image sensor 19, detection elements are arrayed in a direction perpendicular to the sheet surface of FIG. 5 (main scanning direction).

Figure 6:
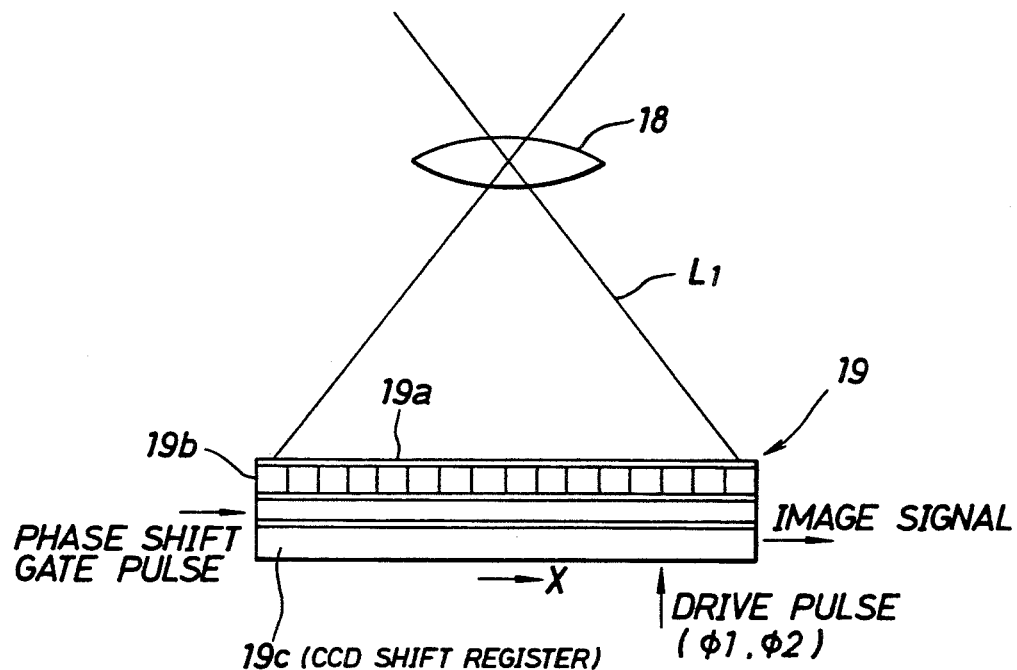
FIG. 6 is a schematic view of a CCD color image sensor shown in FIG. 5.

FIG. 6 shows a detailed arrangement of the image sensor 19. In this arrangement, light $L_1$ focused by the lens 18 radiates the light-receiving surface of the image sensor 19 having B, G, and R mosaic filter layers 19a shown in FIG. 6. Thus, a charge corresponding to a light amount is accumulated in each detection element 19b of image sensor 19, and the accumulated charge is transferred to a transfer section (CCD shift register) 19c in response to a phase shift gate pulse. Thereafter, the charge is transferred and output through the transfer section 19c in a direction of arrow X (main scanning direction) at a speed corresponding to the pulse frequency of the phase shift gate pulse in response to two phase drive pulses $\phi 1$ and $\phi 2$. The obtained output signal is applied to the writing unit D through the image data processor B.

Figure 7:
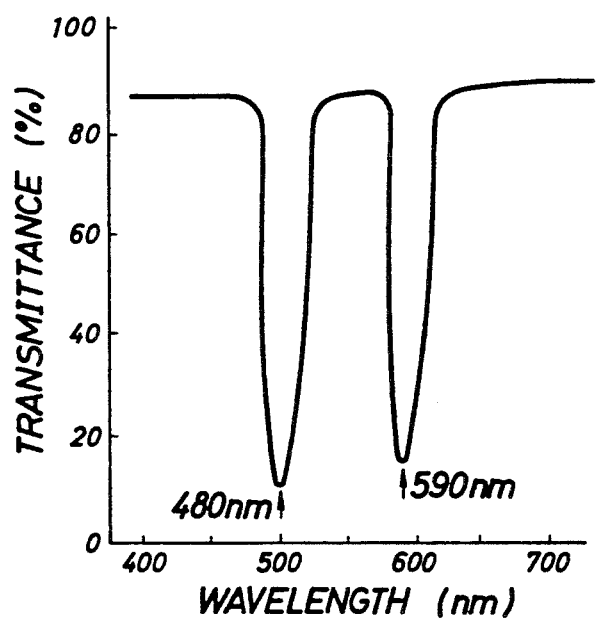
FIG. 7 is a graph showing spectral characteristics of a notched filter.
Figure 8:
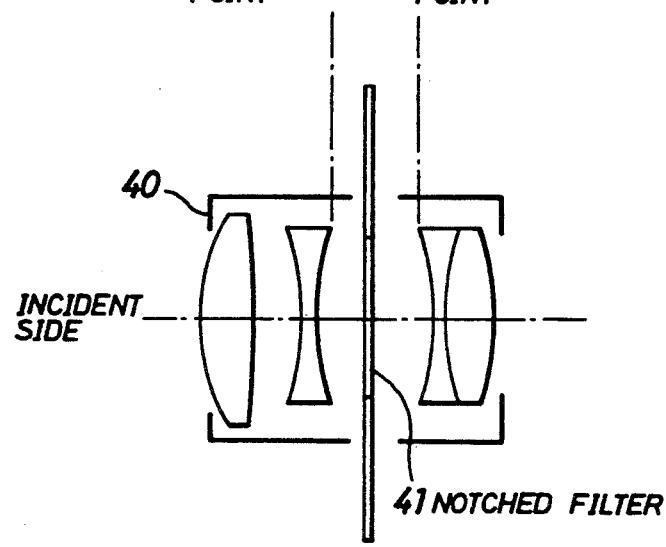
FIG. 8 is a view showing a lens system using the notched filter.
Figure 9:
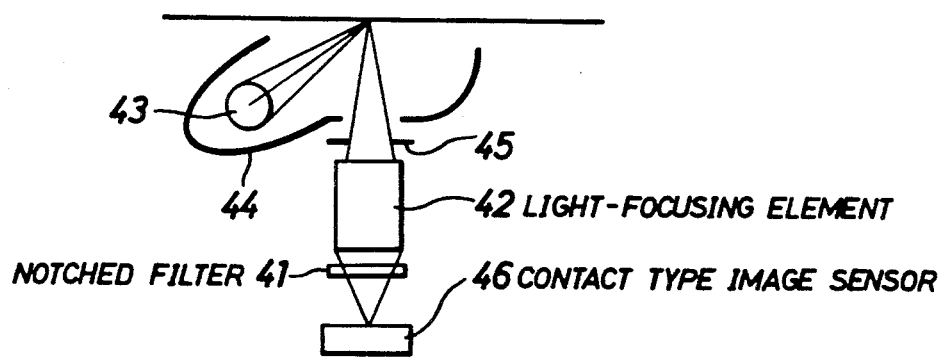
FIG. 9 is a view showing an image reading system using a light-focusing element.

Note that a contact type color image sensor may be used in place of the CCD color image sensor shown in FIG. 6. In order to improve color separation characteristics of a color separation filter, a notched filter for cutting light components between B and G and between G and R is preferably arranged. As the notched filter, an interference filter is preferably used. For example, a notched filter having spectral characteristics shown in FIG. 7 is used. In a lens system shown in FIG. 8, the notched filter 41 is disposed before or after or within a lens system 40. In a reading system using a contact type color image sensor as shown in FIG. 9, the notched filter 41 is used before or after a light-focusing element. In FIG. 9, reference numeral 42 denotes a light-focusing element; 43, an exposure lamp for exposing an image; 44, a reflection mirror; 45, a slit; and 46, a contact type image sensor.

The color reading unit A may employ the following methods. In one method, after light is separated into three color components by a dichroic mirror, these color components are input to the CCD image sensor. In another method, an original is optically scanned by a contact type color image sensor.

In the image forming unit C, reference numeral 20 denotes a drum-like image carrier which has a photoconductive surface layer such as an OPC or Se layer and is rotated in a direction indicated by an arrow in FIG. 5; and 21, a charger for uniformly charging the surface of the image carrier 20. The writing unit D performs color image exposure of a color image on the image carrier 20. Reference numerals 22 to 25 denote developing units using different color toner such as yellow, magenta, cyan, and black toners; 26 and 27, a pre-transfer charger and a post-transfer charger, respectively, for allowing easy transfer to a transfer material P of the color image formed by overlaying a plurality of color toner images on the image carrier 20; 28, a transfer unit for transferring a color image; 29, a fixing unit for the toner image transferred to the transfer material P; and 30 and 31, a discharging lamp and a discharging corona discharger, respectively. One or both of the lamp 30 and the discharger 31 are used. Reference numeral 32 denotes a separation discharging electrode; and 33, a cleaning unit which is brought into contact with the surface of the image carrier 20 after the color image was transferred so as to remove a residual toner thereon. The cleaning unit 33 has a cleaning blade 34 and a fur brush 35 which are separated from the surface of the image carrier 20 before the surface (portion) subjected to the first development has been reached.

As the charger 21, a scorotron corona discharger shown in FIG. 5, which can stably charge without being influenced by the previous charge, is preferably used since the surface of the image carrier 20 which has already been charged is repetitively charged in the second and subsequent image formation processes.

Figure 10:
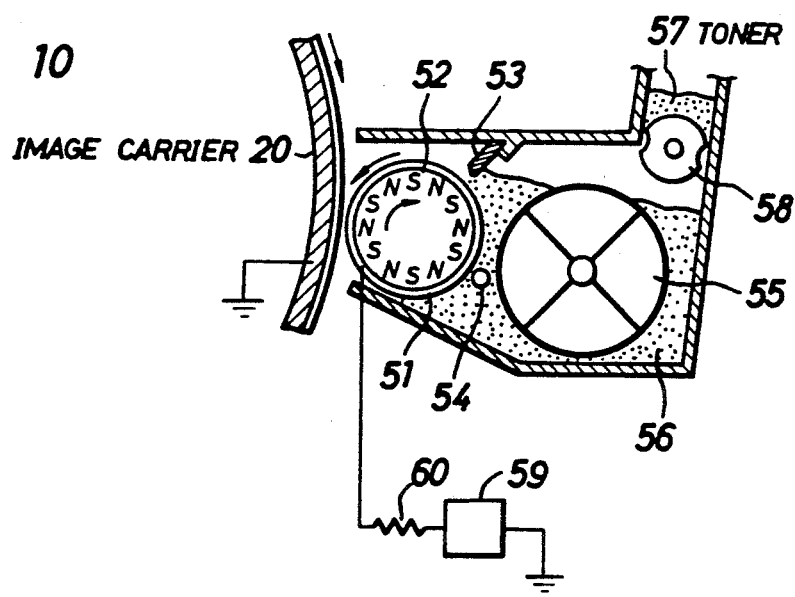
FIG. 10 is a view showing an arrangement of a developing unit shown in FIG. 5.

Each of the developing units 22 to 25 preferably has a structure as shown in FIG. 10. In FIG. 10, reference numeral 51 denotes a developing sleeve of a nonmagnetic material such as aluminum or stainless steel; 52, a magnet arranged inside the developing sleeve 51 and having a plurality of magnetic poles along its circumferential direction; 53, a thickness regulating blade for regulating the thickness of a toner layer formed on the developing sleeve 51; and 54, a scraper blade for removing the toner layer after development from the surface of the developing sleeve 51. Reference numeral 55 denotes a rotary stirring member for stirring a toner in a toner reservoir 56; 57, a toner hopper; 58, a toner replenishing roller having recesses for containing toner on its surface for replenishing toner from the toner hopper 57 to the toner reservoir 56; and 59, a power supply for applying a bias voltage including an AC voltage component, if necessary, to the developing sleeve 51 through a protective resistor 60 to form an electric field for controlling toner motion between the developing sleeve 51 and the image carrier 20. In FIG. 10, the developing sleeve 51 and the magnet 52 are rotated in opposite directions (directions of arrows). However, the developing sleeve 51 may be fixed, or the magnet 52 may be fixed, or the developing sleeve 51 and the magnet 52 may be rotated in the same direction. When the magnet 52 is fixed, magnetism is strengthened or two magnetic poles of the same polarity or opposite polarities are arranged adjacent to each other in order to increase a magnetic flux density of one magnetic pole opposing the image carrier more than those of other magnetic poles. In this developing unit, the magnetic poles of the magnet 52 are normally magnetized at a magnetic flux density of 500 to 1,500 Gauss. The magnetic force of the magnetic poles causes the toner in the toner reservoir 56 to be attracted to the surface of the developing sleeve 51. The thickness of the attracted toner is regulated by the regulating blade 53 to form a toner layer. The toner layer is moved in the same or opposite direction as or to the rotating direction (indicated by arrow) of the image carrier 20, and develops a latent image formed on the image carrier 20 at a developing region where the surface of the developing sleeve 51 faces the surface of the image carrier 20. The residual toner is removed by the scraper blade 54 from the surface of the developing sleeve 51 and is returned to the toner reservoir 56. Regarding at least the second and subsequent development processes which are repeated to overlay color toner images, development is preferably performed under a noncontact development condition so that the toner attached to the image carrier 20 during the previous development process can be prevented from being removed during the following development process. In the noncontact development, the toner layer on the developing sleeve 51 is separated from the image carrier 20 while no developing bias is applied. when a superimposed bias of DC and AC voltages is applied to the developing sleeve, the toner is caused to fly in the presence of an AC electric field and becomes attached to the image carrier 20, thereby developing a latent image. FIG. 10 illustrates a state wherein development is performed under the noncontact development condition.

The developing units 22 to 25 preferably employ a so-called two-component developing agent consisting of a combination of nonmagnetic toner particles and magnetic carrier particles, which can maintain color sharpness without containing a black and/or dark brown magnetic material, and allows easy charge control of toner. In particular, the magnetic carrier is preferably an insulating carrier having a resistivity of $10^8$ $\Omega$cm or more and, preferably, $10^{13}$ $\Omega$cm or more, and prepared by dispersing fine particles of a ferromagnetic material or a normal magnetic material such as triiron tetroxide, $\gamma$-ferric oxide, chromium dioxide, manganese oxide, ferrite, a manganese-copper alloy, or the like in a resin such as a styrene resin, vinyl resin, ethylene resin, rosin deformed resin, acrylic resin, polyamide resin, epoxy resin, polyester resin, or the like, or prepared by coating the surfaces of these particles with the above-mentioned resin. If the resistivity is low, when a bias voltage is applied to the developing sleeve 51, a charge is injected into carrier particles, and the carrier particles are easily attached to the surface of the image carrier, or the bias voltage cannot be sufficiently applied. In particular, when the carrier particles are attached to the image carrier 20, color tone of a color image is impaired.

Note that the resistivity is a value obtained as follows. That is, after particles are stored and tapped in a container having a cross-sectional area of 0.50 cm$^2$, a load of 1 kg/cm$^2$ is applied on the tapped particles, and a voltage for generating an electric field of 1,000 V/cm between the load and a bottom surface electrode is then applied. A current value in this case corresponds to the resistivity.

If the carrier particles have an average particle size of 5 μm or less, its magnetism is too weak. If the average particle size exceeds 50 μm, an image cannot be improved. In addition, breakdown or discharging tends to occur and a high voltage can no longer be applied. Thus, the average particle size preferably falls within the range of 5 μm to 40 μm. A fluidizing agent such as hydrophobic silica is added to the carrier particles as needed.

The toner particles are preferably prepared by adding dyes and a charge control agent (if necessary) to a resin, and preferably have an average particle size of 1 to 20 μm, and the absolute value of an average charging amount ranging from 3 to 300 μC/g, especially, from 10 to 100 μC/g. If the average particle size of the toner particles is below 1 μm, the toner particles cannot be easily separated from the carrier particles. If the average particle size exceeds 20 μm, image resolution is degraded.

When the developing agent consisting of a mixture of the insulating carrier and the toner is used, a bias voltage applied to the developing sleeve 51 shown in FIG. 10 can be easily set so as not to cause fogging and to allow sufficient attachment of toner to a latent image without causing leakage. The toner may contain a magnetic material used as a magnetic carrier in an amount within a range of keeping color sharpness, so that developing movement control of toner upon application of the bias voltage can be effectively performed.

The developing units and the developing agent having the above arrangements are preferably used in the method and apparatus of the present invention. However, the present invention is not limited to these. Developing units and developing agents as described in Japanese Patent Laid-Open (Kokai) Nos. 50-30537, 55-18656 to 55-18659, 56-144452, and 58-116553 to 58-116554 may be used. More preferably, a noncontact developing condition using a two-component developing agent as described in Japanese Patent Laid-Open (Kokai) Nos. 58-57446, 58-96900 to 58-96903, 58-97973, 60-192710 to 60-192711, 60-14537, 60-14539, and 60-176069 filed by the present applicant is used. In particular, in a developing apparatus disclosed in Japanese Patent Laid-Open (Kokai) No. 60-176069, a magnet in a developing sleeve is fixed, and development is performed at a portion having a thin developing agent layer between magnetic poles. Thus, since a developing gap can be reduced, a sufficiently high developing electric field can be formed to obtain high developing performance. Since the magnet is not rotated, it is advantageous for an image forming apparatus having a plurality of developing units.

With the above-mentioned recording method as described above, a toner image formed on the image carrier 20 is transferred directly to the transfer material P by the transfer unit 28 without using a transfer drum. Thus, color mis-registration does not occur, and the apparatus can be made compact. After the pre-transfer charger 26 and the exposure lamp 27 are operated to make the overlaid toner images to be transferred easier, the toner images are transferred onto the transfer material P fed from the paper feeder E upon operation of the transfer unit 28. Thereafter, the transfer material P is separated upon operation of the separation discharging electrode 32 and is heated and fixed by the fixing unit 29. A residual toner on the surface of the image carrier 20 after the transfer operation is cleaned by the cleaning unit 33 having the corona discharger 31 and the cleaning blade 34, thus preparing for the next image formation.

Figure 1A:
Figure 1B:
Figure 1C:
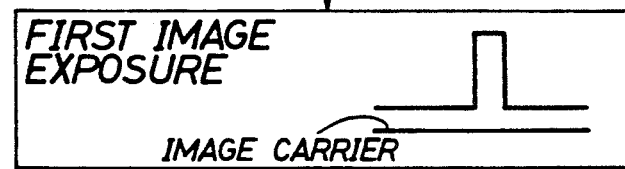
Figure 1D:
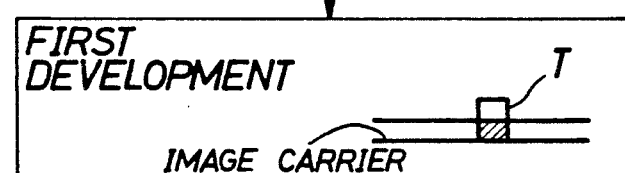
Figure 1E:
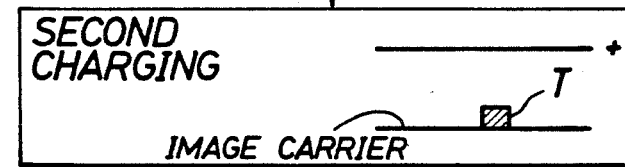
Figure 1F:
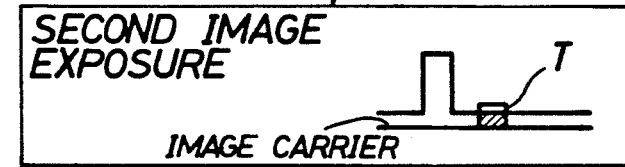
Figure 1G:
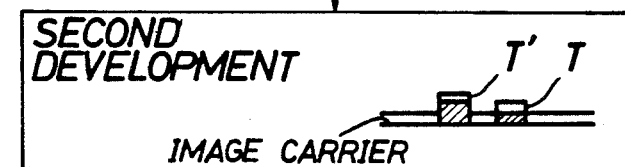
Figure 3:
Figure 3:
Figure 3:
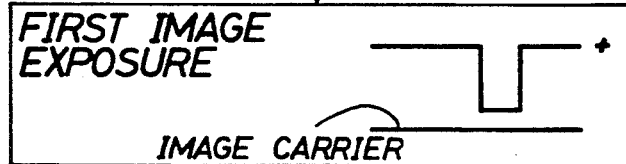
Figure 3:
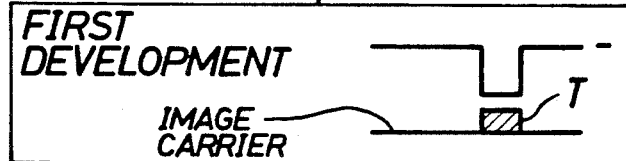
Figure 3:
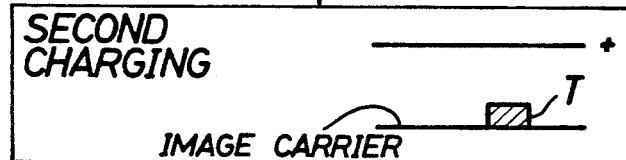
Figure 3:
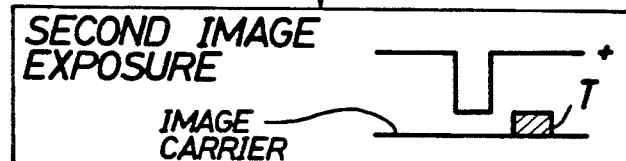
Figure 3:
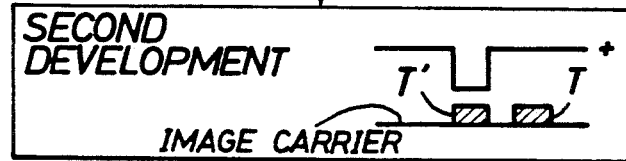
Figure 4:
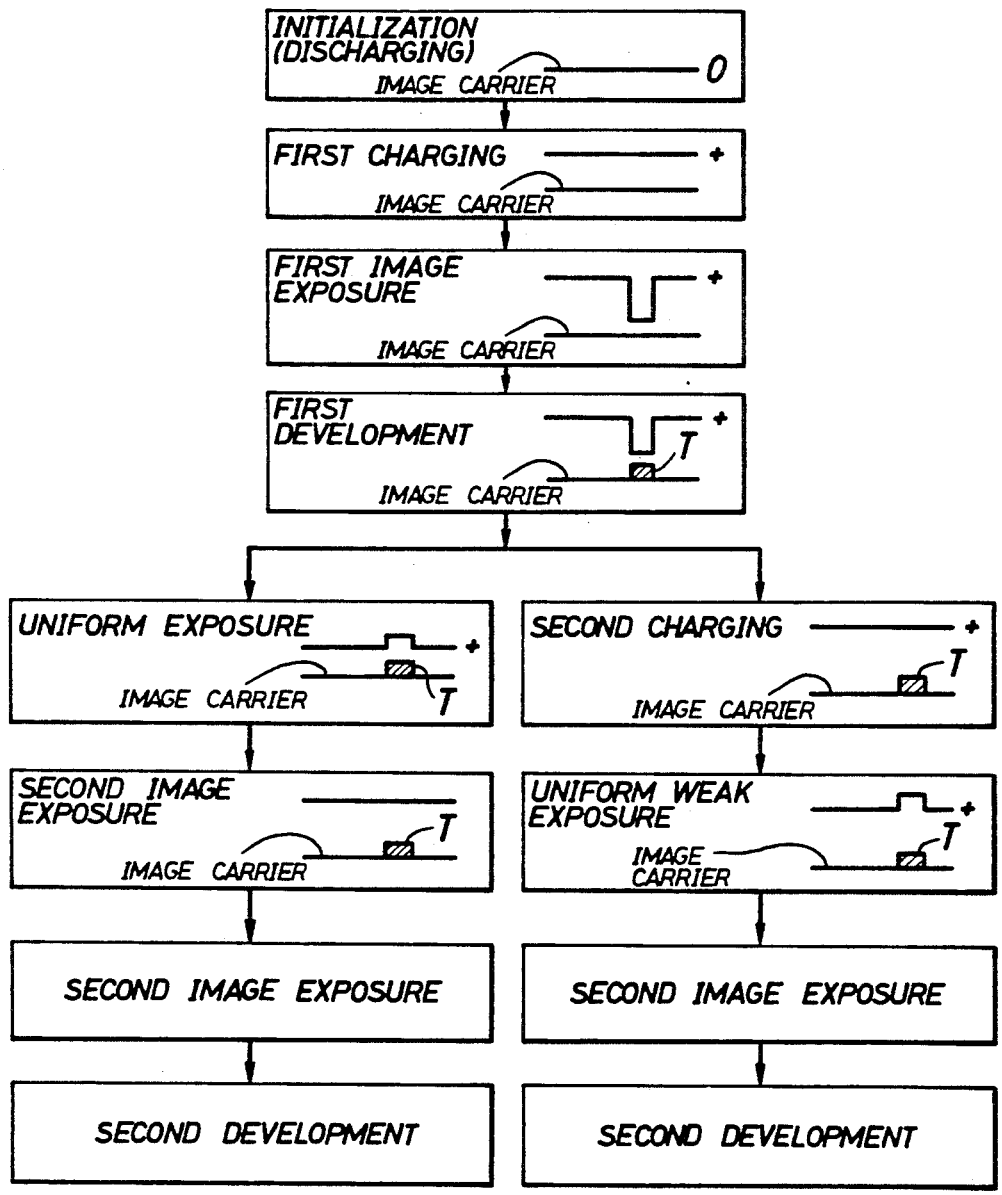

In this case, the image formation process described with reference to FIG. 3 is employed. For this reason, color fogging does not occur, and clear colors can be easily reproduced.

In order to record a sharp color image, the writing unit D preferably comprises a laser beam scanner for performing image exposure, as shown in FIGS. 11A, 11B, and 11C. A latent image formed by image exposure is preferably inverted and developed by the above-mentioned developing unit. If the writing unit D comprises a laser beam scanner, as shown in FIGS. 11A and 11B, latent images in units of colors can be easily formed to be offset from each other, as will be described later. Therefore, a sharp color image can be recorded.

In a laser beam scanner shown in FIG. 11A, a laser beam emitted from a laser 71 such as an He-Ne laser is turned on/off by an acoustic optical modulator 72, and is then deflected by a mirror scanner 74 comprising an octagonal rotary mirror rotated by a drive motor 73. The laser beam then passes through a focusing f-θ lens 75 to be converted into a beam 76 for scanning the surface of the image carrier 20 at a constant speed. Note that reference numerals 77 and 78 denote mirrors; and 79, a lens, which is arranged in front of the focusing f-θ lens 75 so as to radiate the beam having an appropriate spot size onto the image carrier 20, and to optimize the spot size of the incident beam.

A laser beam scanner having a structure shown in FIG. 11B can also be preferably used. In the laser beam scanner shown in FIG. 11B, a laser beam emitted from a semiconductor laser 81 is rotary-scanned by a polygonal mirror 83 which is rotated by a drive motor 82. The laser beam passes through an f-θ lens 84 and is deflected by a mirror 85. Then, the laser beam is projected onto the surface of the image carrier 20, thus forming a bright line 86. Note that reference numeral 87 denotes an index sensor for detecting a beam position in order to control a beam scanning start timing; and 88 and 89, cylindrical lenses for correcting a folding angle. Reference numerals 90a, 90b, and 90c denote mirrors for forming beam scanning and beam detection optical paths.

When a laser beam scanner and an optical polarizer obtained by etching an insulating plate, e.g., a quartz plate, as described in Japanese Patent Application No. 61-239469 filed by the present applicant are used, reciprocal scanning can be performed unlike scanning by a rotary polygonal mirror. When the reciprocal scanning is employed, an optical scanning system can be arranged as shown in FIG. 11C. More specifically, index sensors 87 and 87' are arranged along the scanning direction, so that the scanning start and end (since the beam is returned, it can also be regarded as a scanning start timing) timings can be detected. Thus, corresponding image data can be recorded on the image carrier 20. In FIG. 11C, reference numerals 90c and 90c' denote mirrors. The same reference numerals in FIG. 11C denote the same parts as in FIG. 11B.

Image exposure can be performed by using, e.g., an LED, a CRT, a liquid crystal, or an optical fiber transmission member in addition to the laser beam as described above.

Each image exposure must be performed precisely at an identical position on the image carrier 20. These image exposure positions can be easily and precisely determined by a registration index marker (one marker or a plurality of markers if necessary; not shown) or position detection and image exposure timing control using a conventional photosensor for detecting a pulse or the like of a rotary encoder rotated together with the image carrier 20 for every rotation of the image carrier 20. Thus, the obtained images do not suffer from color mis-registration.

In the case of the laser optical system, when a position control method commonly using a polygonal mirror as an optical scanning means as disclosed in Japanese Patent Laid-Open (Kokai) No. 56-161566, 57-64718, and 59-53866, and a method of forming a plurality of laser beams using a polygonal mirror as disclosed in Japanese Patent Laid-Open (Kokai) No. 60-150066 or a method of forming a plurality of laser beams using an optical modulator are employed, image mis-registration can be satisfactorily prevented.

The electrical arrangement of the embodiment will be described hereinafter.

FIG. 12 is a block diagram showing an electrical arrangement of the embodiment described above, and the same reference numerals in FIG. 12 denote the same parts as in FIG. 5. In FIG. 12, reference numeral 100 denotes a controller (CPU), comprising, e.g., a microcomputer, for performing a variety of types of sequence control. More specifically, the CPU 100 controls the reading unit A, the image data processor B, the image forming unit C, the writing unit D, the paper feeder E, and the like. In the image data processor B shown in FIG. 12, reference numeral 110 denotes an input circuit for receiving the output from the color image sensor 19 in the reading unit A. The input circuit 110 amplifies and logarithmically converts the output from the color image sensor into a density signal. Reference numeral 111 denotes an A/D converter for sampling and holding the output from the input circuit 110 so as to convert analog data into digital data of a predetermined number of bits (e.g., 8 bits). The output from the A/D converter 111 is separated into B, G, and R color image data by a latch circuit 112. Reference numeral 113 denotes a shading correction circuit for removing distortion in data caused by the optical system or the like. Output data DB, DG, and DR from the shading correction circuit 113 for the B, G and R color image data are supplied to a reference memory 114 as address signals.

The reference memory 114 in parallel comprises ROMs, and stores conversion functions in the form of a lookup table for performing masking processing of the data DB, DG, and DR, i.e., for converting the read signals DB, DG, and DR for B, G, and R data into recording toner image signals (and also performing other processing as needed), thereby obtaining color image signals Y, M, C, and BK. The data output from the lookup table can be a combination of 6-bit color data of Y, M, C, and BK and a 2-bit color code. The color code represents the color of each pixel, and can correct unsuitable color data Y, M, C, and BK.

A memory section M1 stores a conversion function $f_1$ into a Y (yellow) toner image signal, a memory section M2 stores a conversion function $f_2$ into an M (magenta) toner image signal, a memory section M3 stores a conversion function $f_3$ into a C (cyan) toner image signal, and a memory section M4 stores a conversion function $f_4$ into a BK (black) toner image signal When these conversion functions $f_1$ to $f_4$, i.e., the correspondences between (DB, DG, DR) and (Y, M, C) toner image signals are determined, various Y, M, C, and BK data are supplied to a gradation correction circuit 115 to cause the image forming unit C to perform recording. The recorded image is read by the reading unit A so as to obtain the signals DB, DG, and DR.

The memory sections M1 tc M4 may store a plurality of types of lookup tables so that a plurality of types of color correction (masking processing) can be performed. In this case, color correction can be performed using an selected lookup table in response to a selection signal. The plurality of types of lookup tables include those corresponding to types of transfer material, those for emphasizing a specific color, and the like. FIGS. 13 and 14 show the detailed format of the memory section M1.

In FIG. 13, reference symbols M11 to M13 denote ROMs storing different color correction lookup tables; and SE, a selector for selecting one of these tables in response to a selection signal S. The output from the selector SE is a 2-bit signal, and is input as an address signal to ROMs M11 to M13 together with the DB, DG, and DR outputs. Therefore, a signal obtained by the lookup table in one of the ROMs M11, M12, and M13 selected by the selector SE is output as a Y signal.

In contrast to this, in FIG. 14, a lookup table (data) in one of ROMs M11 to M13 selected by the selector SE is transferred to a memory M5 comprising a RAM, and the signals DB, DG, and DR are supplied to the memory M5 as address signals, so that color correction using a desired lookup table is performed.

Note that the selection signal S is automatically input in accordance with the output from a sensor detecting the type of transfer material or other conditions, but may be manually input by an operator through a switch. In the latter case, color reproducibility required by an operator can be realized.

Referring again to FIG. 12, reference numeral 115 denotes a gradation correction circuit for gradation-correcting the color image signals Y, M, C and BK output from the reference memory 114 as needed; and 116, a pattern generator for converting the gradation-corrected color image signals into dot patterns suitable for forming the corresponding latent images. The pattern generator 116 preferably employs a Dither method or a density pattern method, and binary or multi-value dot pattern data is formed in accordance with a latent image formation method. A plurality of Dither patterns are preferably prepared so that optimal dot pattern data can be selected in accordance with colors or modes.

The pattern generator 116 may be the following multi-value circuit.

The multi-value circuit has a multi-value ROM and a threshold value ROM. The threshold value ROM stores values of a multi-value Dither threshold value matrix. The values of the multi-value Dither threshold value matrix are supplied to the multi-value ROM in synchronism with color signals in response to a sync signal (not shown). The multi-value ROM uses the color signals and the values of the threshold-value matrix as addresses, and outputs a discrimination result as a multi-value signal.

The multivalue signal is output as a dot pattern.

Reference numeral 117 denotes a selector for sequentially selecting a predetermined one color component (color image data) from the dot pattern data obtained in units of colors. The writing unit D (laser beam scanner) forms a latent image on the image carrier 20 in accordance with the selected color image data. Note that when the reading unit A reads and scans an original a plurality of times corresponding to the number of colors, a latent image corresponding to one color component can be sequentially formed without arranging an image memory for storing image data to be recorded. The latent images are sequentially developed by the image forming unit C, thereby forming a multicolor toner image on the image carrier 20.

Color tone reproduction in the reference memory 114 will be described hereinafter in detail.

In order to reproduce the same color tone as that of an original, a combination of input and output signals for minimizing a color difference is selected based on a discrimination amount (in this embodiment, $\Delta E^*ab$ is used) such as the color difference, and the combination is prestored in the reference memory comprising the ROM. A method of generating color tone reproduction processing data to be stored in the reference memory will be described below.

(1) Reading Characteristics of Reading Unit

About 20 color paper sheets are selected from the Munsell color chips, and are measured by a colorimeter so as to obtain values of each color paper on a CIE-XYZ coordinate system. Each color paper is placed on the original table of the reading unit A and is scanned, thereby obtaining lightness signals DR, DG, and DB of the color paper by the reading unit A.

In this manner, assuming that two types of values {X, Y, Z} and {DR, DG, DB} obtained in this manner have the linear relationship, the following equation is established:

$$\begin{pmatrix} X \\ Y \\ Z \end{pmatrix} = \begin{pmatrix} abc \\ def \\ ghi \end{pmatrix} \begin{pmatrix} DR \\ DG \\ DB \end{pmatrix}$$

where conversion parameters a to i can be obtained from the two types of values {X, Y, Z} and {DR, DG, DB} by approximation based on a method of least square.

When the parameters a to i are obtained in this manner, the R, G, and B signals from the reading unit A can be converted to X, Y, and Z data, and hence, the characteristics of the reading unit A can be determined.

(2) Recording Characteristics of Image Forming Unit

In order to check the output characteristics of the image forming unit C, in this embodiment, the unit C has a function of outputting density levels of four values Y, M, C, and BK. In the apparatus of this embodiment, since the toners are overlaid on each other, the number of colors represented by color toners is $4^4 = 256$. The image forming unit C outputs these colors to obtain color chips. Each of the obtained color chips is placed on the original table of the reading unit A and is scanned to be converted to 8-bit lightness signals DR, DG, and DB. These lightness signals DR, DG, and DB are converted into data on the CIE-XYZ coordinate system, and the converted data are stored.

(3) Dot Pattern Generating Simulation

The image forming unit C can display 256 colors for one dot, as described above. However, color reproduction requires a display function of a still larger number of colors.

In order to solve this problem, in the present invention, a 4-value Dither method is used. In this method, three 4×4 (dot) threshold value matrices are used, so that input signals can be integers falling within the range of 0 to 48, and output signals can be 4-value signals having a 4×4 size.

It requires much labor to output a large number of colors to be reproduced to the image forming unit and to measure all these colors. For this reason, dot pattern generation and color measurement are performed by simulation using a computer.

The simulation will be exemplified below.

Color signals Y, M, C, and BK before they are input to the pattern generator 116 are integers of 0 to 48. In this case, processing is made to increase a BK (black) signal, i.e., an amount of black toner as much as possible. In color printing, overlapping of Y (yellow), M (magenta), and C (cyan) inks at an identical position means reproduction of black color. The processing operations for replacing this black component with a black ink and for suppressing amounts of other chromatic inks to be used are generally called undercolor addition (UCA) and undercolor removal (UCR). In this invention, when all the color signals Y, M, and C are larger than 0 level, the levels of the signals C, M, and, Y are equally decreased so that one of the signals Y, M and C is decreased below 0 level. Instead, the black level is increased accordingly. This operation can be expressed by the following equations:

$$BK + P \times min(C, M, Y) = BK'$$

$$C - BK \times S = C'$$

$$M - BK \times S = M'$$

$$Y - BK \times S = Y'$$

where min( ) is a function of taking a minimum value of values enclosed in parentheses, and P is a parameter indicating a degree of replacement of a BK toner. S is a UCA/UCR switch. In a UCR mode, S=1, and in a UCA mode, S=0. In this case, P=1 and S=1, so that 100% UCR can be performed. In the above equations, BK=0 so that BK' is obtained from only the black component of the Y, M, and C signals. Therefore, the number of colors to be reproduced by the image forming unit is reduced to $49^3$. However, this number of colors to be reproduced is sufficient, and does not influence color reproduction.

A dot pattern of $49^3$ colors to be reproduced is generated as follows. First, one of Y, M, and C signals (0 to 48) is determined. For example, if Y=30, M=20, and C=10, Y'=20, M'=10, C'=0, and BK'=10 are obtained in accordance with the above equations. These Y', M', C', and BK' values are converted to a multi-value (0 to 3) matrix through threshold value matrices shown in FIG. 16. In this case, three threshold value matrices are employed. In the first matrix, numerals 1 to 16 are randomly arranged; in the second matrix, numerals 17 to 32 are randomly arranged; and in the third matrix, numerals 33 to 48 are randomly arranged. If the determined Y, M, and C values correspond to a point at the upper left corner, since Y' is larger than 1 to 17 and is smaller than 33, Y'=2. Similarly, M'=1, C'=0, and BK'=1. The four multi-value matrices, i.e., Y', M', C', and BK' matrices are overlaid as shown in FIG. 17, thus obtaining a multi-value dot pattern.

The C', M', Y', and BK' values at the same position correspond to color components of any one of color chips determined in item (2). For example, assuming that the C', M', Y', and BK' values at the upper left corner of the matrix are respectively C'=1, M'=2, Y'=0, and BK'=2, a color corresponding to a color chip having cyan level "1", magenta level "2", yellow level "0", and black level "2" should be reproduced at that position. In this manner, each element of the matrix can correspond to the types of color chips determined in process (2). Since the colors of color chips are already converted into CIE-XYZ values, a matrix in which these values are re-arrayed can be formed.

FIG. 18 is used to explain such a matrix. A color to be reproduced by the image forming unit can be expressed by an averaged color of a region having a size of 4×4 dots, as shown in FIG. 18. Thus, if the value of a color to be reproduced by the image forming unit C on the CIE-XYZ coordinate system is given by X, Y, and Z, the values X, Y, and Z can be expressed by the following equations:

$$X = (1/16) \sum_{i=1}^{16} Xi$$

$$Y = (1/16) \sum_{i=1}^{16} Yi$$

$$Z = (1/16) \sum_{i=1}^{16} Zi$$

In this case, output dot sizes must be constant. If dot sizes differ in accordance with item (2), the following equations can be used.

$$X = \left( \sum_{i=1}^{16} Xi \cdot Si \right) / \sum_{i=1}^{16} Si$$

$$Y = \left( \sum_{i=1}^{16} Yi \cdot Si \right) / \sum_{i=1}^{16} Si$$

$$Z = \left( \sum_{i=1}^{16} Zi \cdot Si \right) / \sum_{i=1}^{16} Si$$

where Si is an area of a dot.

In this manner, the color reproduction characteristics of the image forming unit C obtained in item (2) can be extended to an averaged color of a small area by calculation on the level of simulation. Similarly, C, M, and Y parameters are independently set, and a total of $49^3$ colors to be reproduced are calculated.

Colors of originals read by the reading unit A in item (1) can be converted to CIE-XYZ values. Then, all the colors to be reproduced when the image forming unit C employs a 4-value 4×4 dither matrix can be obtained by the CIE-XYZ values.

(4) Color Matching

A case will be described wherein data obtained in items (1) and (3) are linked in order to maintain the same color tones as those of the original as much as possible, and the relationship therebetween is obtained as color tone reproduction processing data. In this case, assume that an original is read by the reading unit A, and 8-bit image signals DR, DG, and DB are obtained. These signals are generated for all the possible cases. For every signal generation, the following processing is performed.

The signals DR, DG, and DB are converted into the X, Y, and Z values by the equations obtained in item (1), and are then converted into values on an uniform color space coordinate system. In this case, conversion to CIE-LAB uniform color space is performed. In addition, CIE-LUV or CIE-LHC is also effective.

The CIE-LAB uniform color space conversion equations are as follows:

$$L^* = 116(Y/YO)^{(\frac{1}{3})} - 16$$

$$a^* = 500(X/XO)^{(\frac{1}{3})} - (Y/YO)^{(\frac{1}{3})}$$

$$b^* = 200(Y/YO)^{(\frac{1}{3})} - (Z/ZO)^{(\frac{1}{3})}$$

Colors approximate to those represented by L*, a*, and b* are selected from $49^3$ colors in item (3) obtained by the image forming unit. In this case, although a discrimination amount representing the similarity of each color is necessary, a euclidean distance on the averaged color space can be used therefor.

The signals to be compared are represented on the averaged color space since the averaged color space is designed so that a distance between two points on the averaged color space coincides with a color difference sensitivity of man. Therefore, a color most approximate to the color from the reading unit has a shortest distance (color difference; ΔE*ab on the CIE-LAB color space), and calculation is performed so that the corresponding color is selected from the colors to be reproduced by the image forming unit. The obtained relationship (between the R, G, and B density signals from the reading unit and Y, M, C, and BK signals representing the colors to be reproduced by the image forming unit) can be a color signal portion (6 bits) of the color tone reproduction processing data.

With the above method, if an original color is not present in a color gamut of toners, the most approximate color can be selected and output.

FIG. 19 is a view for explaining the color tone reproduction state. In FIG. 19, although a signal from the reading unit is present outside the reproduction color gamut of the image forming unit, a color having minimum ΔE*ab is selected as a reproduction color. A color having the minimum ΔE*ab is one which is most difficult to detect.

The content of the reference table is determined as described above, is stored in the ROM, and is used as the reference memory. The size of the threshold value matrix can be changed to create a plurality of reference tables, and these tables can be arbitrarily selected and used.

In the above description, 100% UCR is performed. This is preferable in a process of forming a multicolor toner image on the image carrier. This is because it is difficult to overlay a plurality of toner images at an identical position on the image carrier, as described above. When the UCR is performed, the yellow, magenta, and cyan toners are partially replaced with the black toner, and a ratio of overlaying these toners can be reduced. In particular, when the 100% UCR is performed, four colors of toners need not be overlaid on an identical position, theoretically.

In the above embodiment, an 8-bit image signal is input, and is color-corrected into a 6-bit image signal. The input image signal can be subjected to density conversion to be compressed to a 6-bit image signal, and the 6-bit image signal can be used as an input signal of the reference table. In this case, the capacity of the table can be reduced, and a time required for determining the content of the table can be shortened.

The operation of this embodiment (an embodiment of the method of the present invention) will be described hereinafter.

An image on the entire surface of a page is read by electrical main scanning of the image sensor 19 in the reading unit A and sub scanning by movement of the carriage 4. During reading, read image signals are sequentially sent from the image sensor 19 to the input circuit 110 in the image data processor B. These image signals are amplified and logarithmically converted by the input circuit 110, and are converted to the digital data by the A/D converter 111 in the image data processor B. Thereafter, the digital data is separated into color data by the latch circuit 112, and the color data are input to the shading correction circuit 113. The shading-corrected data DB, DG, and DR are input to the reference memory 114 as address signals. The memory sections M1, M2, M3, and M4 in the reference memory 114 respectively obtain color image signals Y, M, C, and BK using the lookup tables selected by the corresponding selection signals S, and output these signals to the gradation correction circuit 115. The gradation-corrected color image signals are input to the pulse generator 116, and dot pattern data for respective colors are sent to the selector 117. In this embodiment, in order to minimize the number of image memories, a drive method in which the reading unit reads an image a plurality of times corresponding to the number of colors is employed. Therefore, the selector 117 selects the BK color image signal during a first reading operation, and sends the selected signal to the writing unit D. During the second, third, and fourth reading operations, the selector 117 selects B, G, and R color image signals, respectively, and sends these signals to the writing unit D.

A first color image signal, e.g., BK, obtained by the first reading operation is sent to the writing unit D. A latent image formed by the writing unit D is developed by the developing unit 25 for applying a BK toner in the image forming unit C. Thus, a first color toner image is formed on the surface of the image carrier 20. The BK toner image as the first color toner image passes below the cleaning unit 33 separated from the image carrier 20 while being held on the surface of the image carrier 20. Control then enters the second cycle for forming a Y toner image as a second color toner image. More specifically, a write operation onto the surface of the image carrier 20 is performed by the writing unit D based on a second color image signal Y in the same manner as in the first color image signal BK, thus forming the corresponding latent image. The latent image is developed by the developing unit 22 for applying a Y toner as a second color toner. Therefore, the Y toner image is formed on the BK toner image which has already been formed.

Third and fourth toner images are formed in the same manner as in the second color toner image formation. More specifically, latent images which are formed based on third and fourth color image signals M and C are developed as M and C toner images using the developing units 23 and 24 for applying M and C toners, respectively.

A composite image of the developed toner images by the first to fourth color image signals is transferred by the transfer unit 28 to the transfer material P fed from the paper feeder E. The transfer material P subjected to the transfer operation is separated from the image carrier 20 by the discharging electrode 32, and is conveyed to the fixing unit 29, so that the toner images are fixed on the transfer material P as a hard copy. On the other hand, the cleaning unit 33 is brought into contact with the image carrier 20 which has completed the transfer operation of the toner images, and removes the residual toner from the surface of the image carrier 20.

The above-mentioned control operation is performed by the controller 100. FIG. 15 shows a timing chart showing the above-mentioned operation of this embodiment controlled by the controller.

The detailed conditions set for carrying out the present invention are as follows.

| (Image Sensor) | |
|---|---|
| Image Sensor: | Contact Type Image Sensor B, G, R Mosaic Filters |
| Resolution: | 16 dots/mm |
| Reading Speed: | 100 mm/s (sub-scanning direction) |
| (Latent Image Forming Means) | |
| Light Source: | Semiconductor Laser |
| Main Wavelength: | 780 nm |
| Intensity: | 40 erg/cm$^2$ |
| (Visible Image Forming Unit) | |
| Image Carrier: | OPC Drum (diameter: 200 mm) rotated at a linear velocity of 100 mm/s (C.W.) |
| Developing Unit: | (1) Developing Sleeve (diameter: 20 mm) rotated at a linear velocity of 370 mm/s during only development (C.C.W.) (2) Magnet Roll (incorporated in sleeve) 12 poles rotated at 1,100 rpm during only development (C.W.) |
| (Developing Conditions) | |
| Developing Potential: | −700 V (Non-exposed Portion) −100 V (Exposed Portion) |
| Developing Bias: | −600 V (DC) 1 to 2 kV$_{p-p}$, 3 kHz (AC) |
| Developing Gap: (Distance between image carrier and developing sleeve) | 1.0 mm |
| Thickness of Developing Agent Layer on Developing Sleeve: | 0.7 mm (MAX) |
| Developing Agent: | Two-Component Developing Agent (Weight Ratio of carrier: toner = 9:1) |
| Toner: | Average Particle Size: 9 μm Resistivity: 10$^{14}$ Ωcm or more Nonmagnetic Material |
| Carrier: | Average Particle Size: 30 μm |

|  |  |
|---|---|
|  | Resistivity: $10^{14}$ Ωcm or more |
|  | Magnetism: 27 emu/g |
|  | Resin-coated Carrier |
| Development Order: | Y → M → C → BK |
|  | C → Y → M → BK |
|  | M → Y → C → BK |
|  | C → BK → M → Y |
|  | M → BK → C → Y |

When multicolor image formation is performed as in the above embodiment, color correction reflecting recording characteristics of a recording unit (the relationship between input image data and optical characteristics of an object to be recorded) can be easily performed even though the recording characteristics are very complicated. A circuit arrangement for realizing the color correction is also very simple, and can perform real-time processing. As a result, a color correction method can be easily changed in accordance with the types of transfer material, other conditions, or a user's favor.

What we claim is:

1. A multicolor image forming method comprising:
   a first step of optically scanning and color separating an original so as to obtain first image signals corresponding to R, G and B multicolor components;
   a second step of selecting one reference memory from a plurality of reference memories storing color correction data;
   a third step of transferring color correction data stored in the reference memory selected in the second step into a further memory;
   a fourth step of parallelly inputting the first image signals as address signals to the further memory storing the color correction data in the third step for converting the first image signals into second image signals corresponding to at least Y, M and C multicolor components for forming color toner images on a movable image carrier having photoconductive properties wherein each of the color toner images respectively correspond to the Y, M and C multicolor components;
   a fifth step of selecting second image signals corresponding to one color component from the second image signals corresponding to the Y, M and C multicolor components output from the further memory in the third step;
   a sixth step of providing a latent image made by image exposure onto the movable image carrier based on the second image signals corresponding to the color component selected in the fourth step; and
   a seventh step of developing the latent image formed on the image carrier in the sixth step using a chromatic toner.

2. The method according to claim 1 wherein each of the plurality of reference memories comprises data of an averaged color space.

3. The method according to claim 1 wherein the reference memory in the second step is selected in accordance with types of transfer material to which the developed image formed in said seventh step is transferred.

4. The method according to claim 1 wherein the reference memory in the second step is selected in accordance with an external instruction for instructing color correction.

5. The method according to claim 1 further comprising an eighth step of repeating the fourth, fifth, sixth and seventh steps while changing color components of the second image signals selected in the fourth step and the color toners used in the seventh step so that a multicolor toner image is formed on the image carrier, and a ninth step of transferring the multicolor toner image formed in the image carrier to a transfer material.

6. The method according to claim 5 wherein each of the plurality of reference memories stores data representative of two different types of color correction, one of the types of color correction being applied to adjust the Y, M and C components for superimposing a plurality of color toner images on the image carrier, and each of the toner images respectively corresponding to the multicolor components.

7. A multicolor image forming apparatus comprising:
   a reading means for optically scanning and color-separating an original so as to obtain first image signals corresponding to R, G and B multicolor components;
   a plurality of reference memories having color correction data for converting the first image signals into second image signals corresponding to at least Y, M and C multicolor components, respectively;
   first selection means for selecting one reference memory from the reference memories;
   a further memory for storing color correction data from the reference memory selected form the reference memories, for parallelly receiving the first image signals as address signals;
   second selection means for selecting second image signals corresponding to one color component form the second image signals corresponding to the Y, M and C multicolor components output from the further memory;
   a movable image carrier surface having a photoconductive property;
   latent image forming means for outputting light modulated based on the second image signals corresponding to the color component selected by the second selection means and scanning the image carrier using the output light;
   a plurality of developing means, storing toners of different colors, respectively, for developing a latent image on the image carrier;
   transfer means for transferring a toner image on the image carrier to a transfer material; and
   control means for outputting a control signal for indicating, to the first and second selection means, a type of image signal to be selected, and a control signal for sequentially instructing at least some of the plurality of developing means to operate.

8. The apparatus according to claim 7 wherein the control means outputs the control signal for sequentially instructing each of the plurality of developing means to operate, so that after a multicolor toner image is formed on the image carrier, the transfer means is operated to transfer the multicolor toner image onto the transfer material.

9. The apparatus according to claim 8 wherein each of the plurality of reference memories stores data representative of two different types of color correction, one of the types of color correction being applied to adjust the Y, M and C components for superimposing a plurality of color toner images on the image carrier, and each of the toner images respectively corresponding to the multicolor components.

10. The apparatus according to claim 7 wherein the one reference memory is selected by the first selection means in accordance with types of transfer material.

11. The apparatus according to claim 7 wherein the one reference memory is selected by the first selection means in accordance with an external instruction for instructing color correction.

12. The apparatus according to claim 7 wherein the second image signals correspond to yellow, magenta, cyan and black multicolor components and the plurality of developing means, respectively store yellow, magenta, cyan and black toners.

13. The apparatus according to claim 12 wherein each of the plurality of reference memories stores data representing two different types of color correction, one of the types of color correction being applied to adjust the Y, M and C components for superimposing a plurality of color toner images on the image carrier, and each of the toner images respectively corresponding to the multicolor components.

14. The apparatus according to claim 12 wherein each of the plurality of reference memories comprises data of an averaged color space.

* * * * *

UNITED STATES PATENT AND TRADEMARK OFFICE
CERTIFICATE OF CORRECTION

PATENT NO. : 5,157,483

DATED : October 20, 1992

INVENTOR(S) : Hisashi Shoji; Seiichiro Hiratsuka

It is certified that error appears in the above-identified patent and that said Letters Patent is hereby corrected as shown below:

```
Claim 7, column 20, line 29, change "form" to --from--; and
                    line 34, change "form" to --from--.
```

Signed and Sealed this

Sixteenth Day of November, 1993

Attest:

BRUCE LEHMAN

Attesting Officer

Commissioner of Patents and Trademarks